US012687256B2

(12) United States Patent
Jacobsen et al.

(10) Patent No.: US 12,687,256 B2
(45) Date of Patent: Jul. 21, 2026

(54) CONDENSATE DRAIN FOR DRAINING CONDENSATE

(71) Applicant: GESTRA AG, Bremen (DE)

(72) Inventors: Preben Jacobsen, Delmenhorst (DE); Holger Schröter, Achim (DE)

(73) Assignee: GESTRA AG, Bremen (DE)

( * ) Notice: Subject to any disclaimer, the term of this patent is extended or adjusted under 35 U.S.C. 154(b) by 1 day.

(21) Appl. No.: 18/865,282

(22) PCT Filed: Jun. 8, 2023

(86) PCT No.: PCT/EP2023/065366
§ 371 (c)(1),
(2) Date: Nov. 12, 2024

(87) PCT Pub. No.: WO2023/237666
PCT Pub. Date: Dec. 14, 2023

(65) Prior Publication Data
US 2025/0297706 A1      Sep. 25, 2025

(30) Foreign Application Priority Data

Jun. 10, 2022    (DE) .................... 10 2022 114 720.7

(51) Int. Cl.
*F16T 1/40* (2006.01)
*F16K 31/04* (2006.01)
(52) U.S. Cl.
CPC .............. *F16T 1/40* (2013.01); *F16K 31/043* (2013.01); *F16K 31/046* (2013.01)
(58) Field of Classification Search
CPC ....... F16T 1/40; F16T 1/12; F16T 1/14; F16T 1/10; F16T 1/42; F16T 1/45; F16T 1/383; F16T 1/305; F16K 31/043; F16K 31/046
(Continued)

(56) References Cited

U.S. PATENT DOCUMENTS 3,575,199 A       4/1971  Beattie
6,960,847 B2 *  11/2005  Suzuki ................. H01F 7/1615
                                                                    335/229
(Continued)

FOREIGN PATENT DOCUMENTS

DE        102016200863 A1 *   7/2017  ............. F16T 1/383

OTHER PUBLICATIONS

DE-102016200863-A1, Schroter, Machine Translation (Year: 2017).*
(Continued)

*Primary Examiner* — Daphne M Barry
(74) *Attorney, Agent, or Firm* — Posz Law Group, PLC

(57) ABSTRACT

The invention relates to a condensate drain for draining condensate, with a housing, an interior space formed in the housing for accommodating a fluid, an inlet formed in the housing for introducing fluid into the interior space, an outlet formed in the housing for draining fluid out of the interior space, a valve arranged in the housing with a valve body, which is configured for being moved into a release position and a closed position, wherein the valve body, when in the release position, releases a fluid flow between the interior space and the outlet and, when in the closed position, blocks a fluid flow between the interior space and the outlet and a drive device for moving the valve body into the release position and/or the closed position, wherein the drive device is formed as an electromagnetic or magnetically acting drive or has an electromagnetic drive.

35 Claims, 10 Drawing Sheets

(58) Field of Classification Search
USPC ...................................................... 251/129.1
See application file for complete search history.

(56) References Cited

U.S. PATENT DOCUMENTS

2007/0006918 A1   1/2007   Yamamoto
2017/0254474 A1   9/2017   Sauer

OTHER PUBLICATIONS

Office Action issued Nov. 25, 2025 in corresponding Japanese patent application No. 2024-572485 (and English machine translation).

Office Action issued Oct. 17, 2025 in corresponding European patent application No. 23732028.8 (and partial English machine translation).

International Search Report of the International Searching Authority mailed Oct. 12, 2023 for the corresponding International Application No. PCT/EP2023/065366 (and English translation).

Written Decision of the International Search Authority mailed Oct. 12, 2023 for the corresponding International Application No. PCT/EP2023/065366 (and machine English translation).

International Preliminary Report on Patentability of the International Searching Authority mailed Dec. 10, 2024 and Written Opinion of the International Searching Authority mailed Oct. 12, 2023 issued in corresponding International Application No. PCT/EP2023/065366 (and English translation).

* cited by examiner

CONDENSATE DRAIN FOR DRAINING CONDENSATE

CROSS-REFERENCE TO RELATED APPLICATIONS

This application is a U.S. national stage application of PCT/EP2023/065366 filed on Jun. 8, 2023, which is based on and claims priority to German Patent Application No. 10 2022 114 720.7 filed on Jun. 10, 2022, the entire contents of which are incorporated herein by reference.

The invention relates to a condensate drain for draining condensate, with a housing, an interior space formed in the housing for accommodating a fluid, an inlet formed in the housing for introducing fluid into the interior space of the housing, an outlet formed in the housing for draining fluid out of the interior space of the housing, a valve arranged in the housing with a valve body, which is configured for being moved into a release position and a closed position, wherein the valve body, when in the release position, releases a fluid flow between the interior volume and the outlet and, when in the closed position, blocks a fluid flow between the interior volume and the outlet, as well as a drive device for moving the valve body, which is configured for moving the valve body into the release position and/or the closed position.

Condensate drains of this type are known from the prior art. They are used to drain condensate created in steam-conveying plants, for example of the chemical or energy industry. For example, float condensate drains are known from the prior art, which are mounted at certain positions in a steam-conveying plant at which accumulations of condensate are to be expected. In the case of such flat condensate drains, the discharge of the condensate takes place as a function of the fill level of the condensate in the housing of the float condensate drain. If the fill level in the housing exceeds a predetermined level or height, a flat ball, which is arranged in the housing and which is coupled to a valve, floats, whereby the valve is actuated and the flow cross section in the condensate drain is opened. The condensate then flows out of the housing in the direction of the outlet. If the fill level falls below a predetermined minimum, the valve closes by means of the float ball, which sinks. The function of the float condensate drain is thereby largely independent of the temperature of the condensate and provides for pressure fluctuations in the system.

Even though condensate drains of this type, which are already known from the prior art, have proven themselves, there is still room for improvements. As a function of, for instance, the steam pressures, float condensate drains generally have a comparatively large volume in order to be able to accommodate a float with corresponding buoyancy. The responsiveness of condensate drains of this type is furthermore firmly predefined due to the design and mechanics thereof. Apart from that, it has proven to be challenging to monitor classical float condensate drains of this type and to in particular integrate them in digitized plants.

First concepts are further known, which have used a motorized drive device for moving a valve body in compressed air systems; in plants with high steam pressures and steam temperatures, drives of this type cannot be used while ensuring a required tightness and temperature resistance.

In light of the foregoing, the invention was based on the object of further developing a condensate drain of the above-identified type to the effect that the disadvantages found in the prior art are eliminated as much as possible. In particular, a condensate drain was to be specified, which is designed in a compact manner, which can be monitored easily and which furthermore provides a safe operation even when being used in plants with high steam temperatures and steam pressures, wherein a high tightness against the surrounding area is to be attained.

In the case of a condensate drain of the above-mentioned type, the object is solved according to the invention in that the drive device is formed as electromagnetic or magnetically acting drive or has an electromagnetic drive. The invention utilizes the realization that a precise movement of the valve body is made possible by using such an electromagnetic drive, whereby it is simultaneously ensured that a high tightness of the condensate drain is attained. A good integration ability also in digitized control systems, the possibility of a compact design and a precise actuation of the valve body is furthermore advantageous.

The drive preferably has a movable drive part, which is arranged in the interior space of the housing and which is coupled to the valve body, and a static drive part, which is arranged outside of the interior space and which is separated from the latter in a fluid-tight manner in particular by means of a wall section, wherein the static drive part is configured for driving the movable drive part by means of a magnetic drive force.

This preferred further development utilizes the realization that the movable drive part in the interior space of the housing is separated in a fluid-tight manner from the static drive part outside of the interior space. A drive of the valve body is made possible in this way, without the drive having to have, for instance, a movable feedthrough through the housing. In a sense, the interior space is isolated from the static drive part in this way and it is attained hereby that the condensate drain always remains tightly closed even when being used in synopsis with high steam temperatures and high steam pressures. The respective drive simultaneously provides for a compact formation of the condensate drain, without a large interior volume being required for accommodating a correspondingly dimensioned float. The drive can furthermore be adapted to the desired operating parameters by suitable control thereof.

According to a preferred embodiment, the drive is formed as linear motor, wherein the movable drive part is formed as runner and the static drive part as stator. The use of a linear motor has proven to be well suited for driving the valve body, wherein the basic principle of the linear motor provides the isolated formation of runner and stator.

The invention is further developed in that the drive device has a tube, which is connected in a fluid-conducting manner to the housing on the inner side and in the interior of which the runner is accommodated, wherein the outer side of the tube is sealed against the housing, wherein the stator is arranged or formed on the outer side of the tube. Dynamic seals, which are exposed to stronger wear, can be avoided according to the invention. By means of the arrangement of the stator on the outer side of the tube and the accommodation of the runner in the interior of the tube, the idea of the isolation of the interior tube space and thus of the runner from the stator on the outer tube side is attained again. The tubular basic shape furthermore provides a particularly suitable guidance for the runner within the tube.

The runner preferably has at least two permanent magnets, which are in particular formed as ring or disk magnet. According to a preferred embodiment, the permanent magnets are separated from one another by means of a non-magnetic distance piece. According to a preferred embodiment, the stator has at least two coils, which are configured for generating a magnetic field for driving the runner.

The invention is further developed in that the linear motor is configured for capacitively determining a position of the runner. On the basis of the above features, it is not only attained that the runner can be driven securely and by transmitting the required forces, but it is furthermore attained that the position thereof is also determined, whereby conclusions to the position of the valve body are possible at the same time. In other words, the opening state of the valve can be monitored in this way and this information can be used to control the condensate drain.

The invention is also further developed in that the valve body is formed as roller ball, which is configured for releasing a valve seat of the valve when in the release position and for closing the valve seat when in the blocked position. According to a preferred embodiment, the valve body is further configured for releasing the valve seat in sections in at least an intermediate position, which is arranged between the release position and the blocked position. It is made possible in this way to either open the valve completely, to close it completely but also to open it only partly. The release of condensate from the condensate drain becomes finely controllable hereby, in that the valve body is brought into the position, which is desired for control reasons.

According to a preferred embodiment, the roller ball is arranged on a roller ball lever, wherein the roller ball lever is connected to the runner in such a way that a translatory movement of the runner moves the roller ball from the release position into the blocked position and vice versa. The required operating forces can furthermore be applied to the roller ball by means of the use of such a roller ball lever in consideration of the lever principles.

According to a preferred embodiment, the condensate drain is flown through essentially horizontally when in an operating position, wherein the runner of the linear motor is driven in an essentially horizontal direction.

According to an alternatively preferred embodiment, the condensate drain is flown through essentially vertically when in an operating position, wherein the runner of the linear motor is driven in an essentially vertical direction.

In the case of a vertical flow-through of the condensate drain, it is preferably provided that the roller ball lever is supported on the housing by means of a spring element in such a way that a movement of the roller ball lever into the release position is supported by a spring force of the spring and a movement of the roller ball lever into the closed position tensions the spring. It is attained in this way that the actuating forces of the roller ball lever in the direction of the closed position and of the release position will be approximately the same, when the condensate drain is flown through vertically, whereby a control or regulation, respectively, of the linear drive is simplified.

According to an alternative preferred embodiment, the drive is formed as axial flux motor, wherein the movable drive part is formed as rotor and the static drive part as stator. Such an axial flux motor essentially utilizes the same operating concept as a linear drive but does not convert the movement into a linear movement, but into a rotational movement.

The rotor preferably has three or more permanent magnets, in particular six permanent magnets, which are in particular spaced apart equidistantly from an axis of rotation of the rotor and evenly from one another in the circumferential direction. The transmission of sufficient operating forces is made possible in this way and a good ability to control the axis flux motor is furthermore attained.

According to a preferred embodiment, the stator has three or more coils, in particular six coils, which are configured for generating a magnetic field for driving the rotor, wherein the coils in particular have the same distance from the axis of rotation of the rotor as the magnets, in particular wherein at least one, in particular all of the coils, have a ferromagnetic core for strengthening the magnetic field. By means of the formation of the stator with three or more, in particular six coils, a secure force transmission from the stator to the rotor is made possible. A strengthening of the magnetic field furthermore takes place by means of the ferromagnetic core.

The invention is further developed in that the rotor is accommodated on the inner side of a housing wall of the interior space and wherein the stator is arranged on the outer side of the housing wall. It is attained in this way that the rotor is sealingly isolated from the stator, so that an escape of steam out of the housing is reliably avoided. No movable parts need to be guided through a housing opening, so that the leakage risk as a whole is reduced significantly.

According to a preferred embodiment, the rotor is connected in a rotationally fixed manner to a spindle, wherein the spindle is mounted in a rotationally movable manner on the housing. The invention is further developed in that the valve body is formed as disk, which is rotatable about an axis of rotation, with an aperture recess, wherein the aperture recess is made to overlap with a flow channel by means of rotation of the disk into the release position in such a way that a fluid-conducting connection to the outlet is released and the disk blocks a fluid-conducting connection to the outlet by means of rotation into the closed position. According to a preferred embodiment, the spindle has a spindle runner, which is coupled to the disk via an actuating section in such a way that an axial movement of the spindle runner along the spindle effects a rotation of the disk into the release position and the closed position.

According to a preferred further development, the actuating section is pivotably mounted on an end facing away from the spindle runner, wherein the disk has a cam, which is movably guided in a groove of the actuating section in such a way that a pivoting movement of the actuating section effects a rotation of the disk. According to a preferred embodiment, the disk is an upper disk, wherein a lower disk, which serves as rotary bearing for the upper disk, is arranged below the upper disk, wherein in particular the upper disk is pushed against the lower disk by means of a spring element. It is attained in this way that the actuating resistance is reduced due to the formation of two disks, which are arranged one on top of the other. At least one of the disks is or in particular both disks are, respectively, made of a ceramic material. The friction behaviour and the wear are positively influenced hereby again.

According to an alternatively preferred further development, the valve body is formed as valve pin, which is rotatably accommodated on a valve sleeve, and wherein the valve pin has an outlet groove, which, when in the release position, is in fluid-conducting connection with an aperture opening formed in the valve sleeve and which releases a fluid flow through the valve and which, when in a closed position, blocks a fluid flow through the valve, wherein the valve body can in particular additionally be brought into an intermediate position, in which the outlet groove is at least partly in fluid-conducting connection with the aperture opening.

The invention is further developed in that the valve pin is connected to a lever and wherein the lever is connected to the runner in such a way that a translatory movement of the runner rotationally moves the valve pin from the release position into the blocked position and vice versa. A transformation of a translatory movement of the runner into a rotational movement for actuating the valve pin takes place in this way.

According to a preferred embodiment, the condensate drain has a sensor device for detecting at least one operating state of the fluid and/or of the condensate drain and for providing at least one signal, which represents the at least one operating state. The condensate drain preferably further has a control device, which is formed for receiving the at least one signal and for outputting a control signal to the drive device for moving the valve body and/or to the higher-level controller. The sensor device and/or control device can be assigned directly to the condensate drain or can be part thereof or can alternatively also be formed as individual component, which is coupled to the condensate drain. It is attained in an advantageous manner by means of this aspect of the condensate drain that signals provided by the sensor device for controlling the drive device, thus in particular the electromagnetically or magnetically acting drive or electromagnetic drive are transmitted, thus that a system is attained, which is autonomous from a control-related aspect and which is based on values, which are measured by the sensor device and which are used for the actuation of the drive for controlling and moving the valve body. In contrast to, for example, float condensate drains, this has further advantages, which are, for example, that sensor data can be detected, further processed, evaluated and be used for controlling the condensate drain, e.g., in an integrated control system with high proportions of digital technology.

The invention is further developed in that the sensor device has a level electrode formed on the housing for detecting a level of the fluid, wherein the level electrode preferably extends essentially vertically in the operating position and which is configured for sensing a fluid level in the housing.

The sensor device preferably has a Hall sensor, which is configured for sensing a position of the runner and/or rotor and for determining a valve position in particular from the position of the runner and/or rotor.

The sensor device is preferably a pressure sensor and/or temperature sensor accommodated in the housing.

The invention is further developed in that the control device is connected in a wired or wireless manner to the sensors so as to conduct signals, wherein the control device is configured for controlling the drive device in such a way that the latter moves the valve body into the closed position or the release position as a function of a measuring value of at least one of the sensors. The control device is preferably further configured for moving the valve body into an intermediate position between the closed position and the release position.

The invention is further developed in that a Peltier element is arranged on the housing, in particular on the drive device, which Peltier element is configured for generating electrical energy from a temperature difference between a housing temperature and an ambient temperature of the housing and/or wherein the condensate drain has an external energy supply. It is made possible in this way to supply energy to the condensate drain either from an external energy source or to generate the energy on its own by utilizing the Peltier effect. The invention is further developed in that the Peltier element is connected to the drive device and/or the control device and wherein the electrical energy generated by the Peltier element is used for operating the drive device and/or the control device.

The control device preferably has a data interface, which is configured for receiving data from a wired or wireless network and/or for sending data to a wired or wireless network, wherein the data has at least one of the following: measuring values of at least one of the sensors, position of the runner or of the rotor as indicator for the valve position, control data for controlling the drive device. It is made possible in this way to control the drive device or the condensate drain, respectively, via an external controller and to transfer respective measuring values, such as, for example, the fluid level, pressures, temperatures, position of the runner or rotor, to a corresponding data network. The data is preferably stored in a cloud or is transmitted from a cloud to the condensate drain. For example, data relating to a chemical, energy technology or another industrial plant can thus advantageously be detected and evaluated by means of a condensate drain according to the invention.

The invention has been described above with reference to a condensate drain. In a further aspect, the invention relates to a method for draining condensate, in particular by using a condensate drain according to at least one of the above exemplary embodiments. With regard to the method, the invention solves the above-identified object by means of the steps: sensing a measuring value, which is indicative of a fluid level within an interior housing space of the condensate drain, controlling a drive device in such a way that the latter moves a valve body of the condensate drain into the closed position or the release position as a function of the measuring value.

The method utilizes the same advantages and preferred embodiments as the condensate drain according to the invention and vice versa. Reference is made in this respect to the above statements and the content thereof is included here.

The invention will be described in more detail below on the basis of preferred exemplary embodiments with reference to the enclosed figures, in which.

Figure 1:
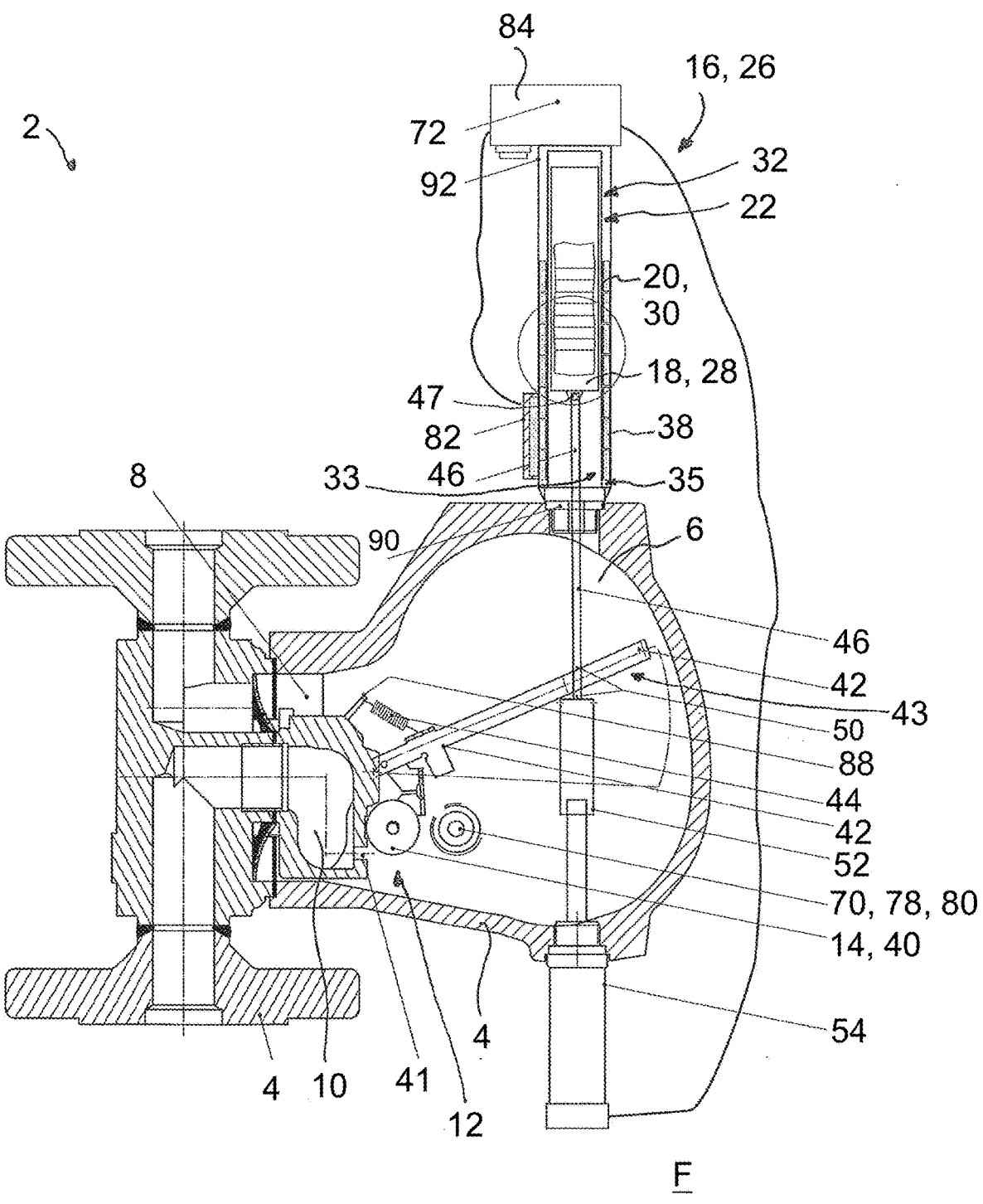
FIG. 1 shows a first exemplary embodiment of a condensate drain according to the invention in a sectional view in a first operating state.
Figure 2:
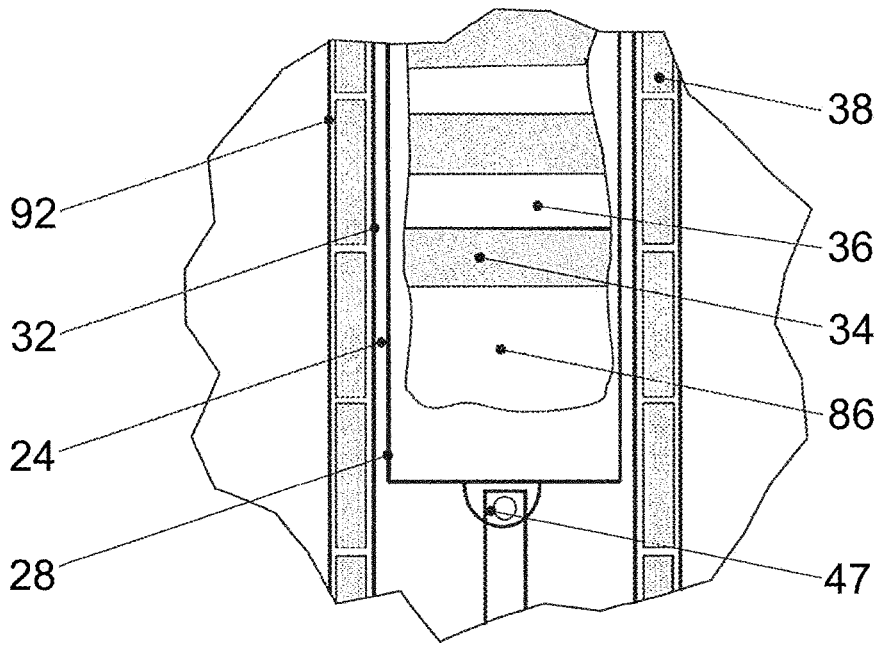
FIG. 2 shows a detail view of the condensate drain according to FIG. 1.
Figure 3:
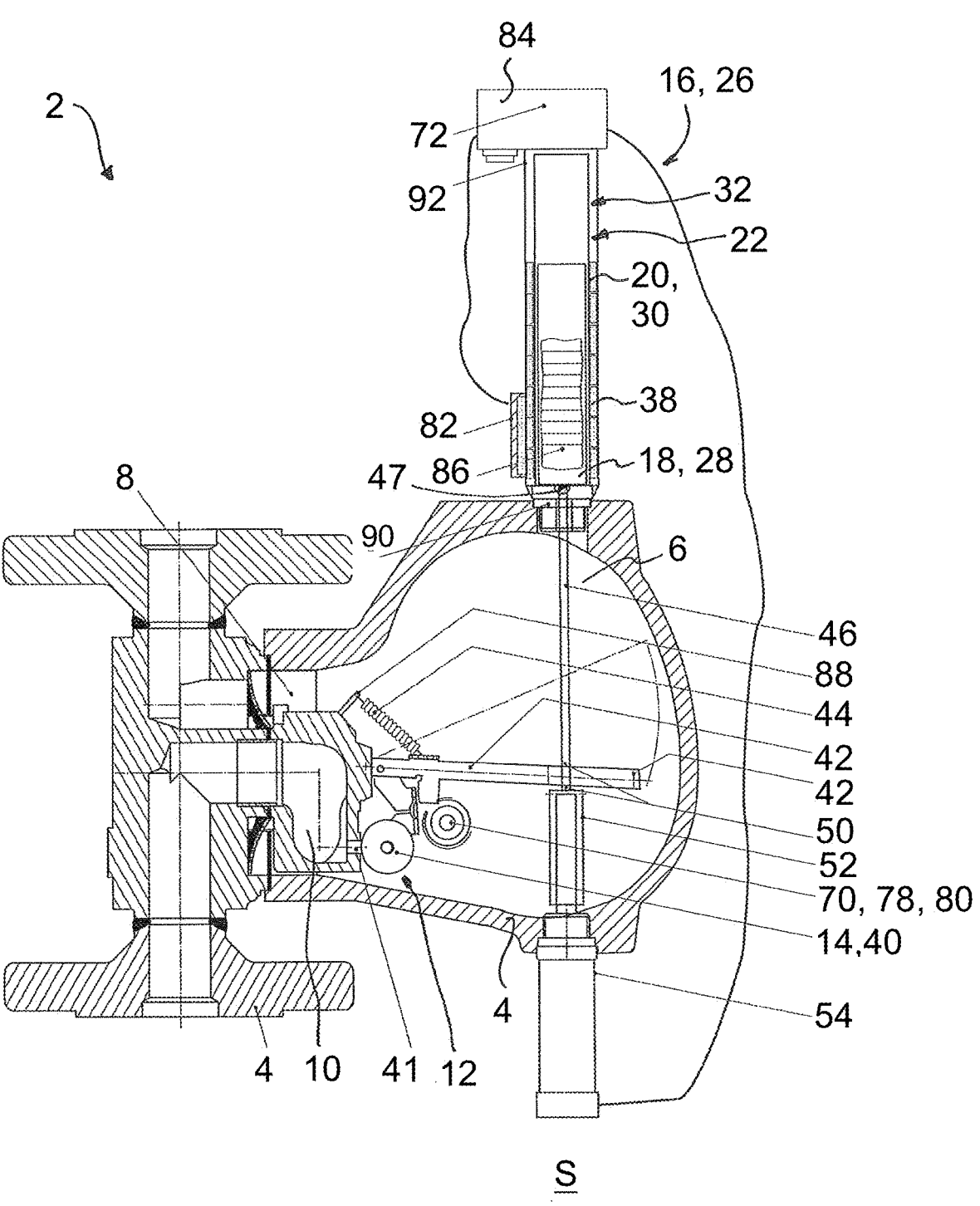
FIG. 3 shows the exemplary embodiment of the condensate drain according to the invention according to FIGS. 1 and 2 in a second operating state.

FIGS. 1 to 3 show a condensate drain 2 for draining condensate. The condensate drain 2 has a housing 4. An interior space 6, which is configured for accommodating a fluid, is formed in the housing 4. An inlet 8 if further formed in the housing 4. The inlet 8 is configured for introducing fluid into the interior space 6 of the housing 4. An outlet 10 is further arranged in the housing 4. The outlet 10 is configured for draining fluid out of the interior space 6 of the housing 4. A valve 12 is further arranged in the housing 4. The valve 12 has a valve body 14, which is configured for being moved into a release position F and a closed position S. When in the release position F, the valve body 14 releases a fluid flow between the interior space 6 and the outlet 10 and, when in the closed position S, blocks a fluid flow between the interior space 6 and the outlet 10. The condensate drain 2 further has a drive device 16 for moving the valve body 14.

The drive device 16 is configured for moving the valve body 14 into the release position F and/or the closed position S. The drive device 16 is formed as electromagnetic or magnetically acting drive 16. The drive device 16 has a movable drive part 18, which is arranged in the interior space 6 of the housing 4 and which is coupled to the valve body 14.

The drive device 16 further has a static drive part 20, which is arranged outside of the interior space 6 and which is separated in a fluid-tight manner from the latter by means of a wall section 22. The static drive part 20 is configured for driving the movable drive part 18 by means of a magnetic drive force. In FIGS. 1 and 2, the valve body 14 is in the release position F, so that a fluid flow between the interior space 6 and the outlet 10 is released.

The drive device 16 is formed as linear motor 26. The movable drive part 18 is formed as runner 28. The static drive part 20 is formed as stator 30. The drive device 16 has a tube 32, which is connected in a fluid-conducting manner to the housing 4 on the inner side. The runner 28 is accommodated in an interior 33 of the tube 32. An outer side 35 of the tube 32 is sealed, welded or soldered with respect to the housing 4. The stator 30 is arranged on the outer side 35 of the tube 32. The runner 28 has permanent magnets 34, which are formed as ring or disk magnet. The permanent magnets 34 are separated from one another by means of a respective distance piece 36. The stator 30 has at least two coils, in the present exemplary embodiment a larger number of coils, which are configured for generating a magnetic field for driving the runner 28. The linear motor 26 is further configured for capacitively determining a position of the runner 28.

In the case of the exemplary embodiment shown in FIGS. 1 to 3, the valve body 14 is formed as roller ball 40. The roller ball 40 is formed for releasing a valve seat 41 of the valve 12 when in the release position F and for closing the valve seat when in the blocked position S. As already specified, the release position F is shown in FIGS. 1 and 2; the closed position S in FIG. 3. The valve body 14 is further configured for releasing the valve seat 41 in sections in at least one intermediate position Z. The intermediate position Z lies between the release position F and the blocked position S. The roller ball 40 is arranged on a roller ball lever 42. The roller ball lever 42 is connected to the runner 28 in such a way that a translatory movement of the runner 28 moves the roller ball 40 from the release position F into the blocked position S and vice versa.

In the case of the exemplary embodiment shown in FIGS. 1 to 3, the condensate drain is flown through essentially vertically in an operating position. In this respect, the runner 28 of the linear motor 26 is also driven in an essentially vertical direction. The roller ball lever 42 is supported on the housing 4 by means of a spring element 44 and a spring bearing 88 in such a way that a movement of the roller ball lever 42 into the release position F shown in FIGS. 1 and 2 is supported by a spring force of the spring element 44. A movement of the roller ball lever 42 into the closed position S tensions the spring element 44.

The condensate drain 2 further has a sensor device 70 for detecting at least one operating state of the fluid and/or of the condensate drain 2. The condensate drain 2 further has a control device 72, which is formed for outputting a control signal to the drive device 16, for moving the valve body 14. The sensor device 70 further has a pressure sensor 78 as well as a temperature sensor 80 accommodated in the housing 4. The control device 72 is connected in a wired or wireless manner to the sensors 74, 78, 80 so as to conduct signals. The control device 72 is configured for controlling the drive device 16 in such a way that the latter moves the valve body 14 into the closed position S or the release position F as a function of a measuring value of at least one of the sensors 74, 78, 80.

A Peltier element 82 is arranged on the housing 4, in particular on the drive device 16. The Peltier element 82 is configured for generating electrical energy from a temperature difference between a housing temperature and an ambient temperature of the housing 4. Alternatively or additionally, the condensate drain 2 has an external energy supply. The Peltier element 82 is connected to the drive device 16 and/or the control device 72. The electrical energy generated by the Peltier element 82 is used for operating the drive device 16 and the control device 72. The control device 72 further has a data interface, which is not further detailed in the figures. The data interface is configured for receiving data from a wired or wireless network and/or for sending data to a wired or wireless network, wherein the data has at least one of the following: measuring values of at least one of the sensors 72, 78, 80, position of the runner 28 as indicator for the valve position, control data for controlling the drive device 16.

As can in particular be gathered from FIG. 2, a compensating gap 24 is provided between the runner 28 and the tube 32. As can be gathered from FIGS. 1 and 2, a drive rod 46 is connected to the runner 28 via a bearing 47. The drive rod 46, in turn, is guided through an elongated hole 43 of the roller ball lever 42 and two pins 50 ensure the axial connection. The pins 50 have the effect that the drive rod 46 "entrains" the roller ball lever 42. A sliding sleeve 52, which is supported on a position indicator 54, is further connected to the drive rod 46. A movement of the roller ball lever 42 takes place by means of a movement of the drive rod 46. As can be gathered in particular from FIG. 2, the runner 28 has an end piece 86. The drive device 16 further has a drive housing 92, which is screwed to the housing 4 via a housing screw connection 90. As already specified, the valve body 14, when in the state shown in FIG. 3, is in the closed position S.

Figure 4:
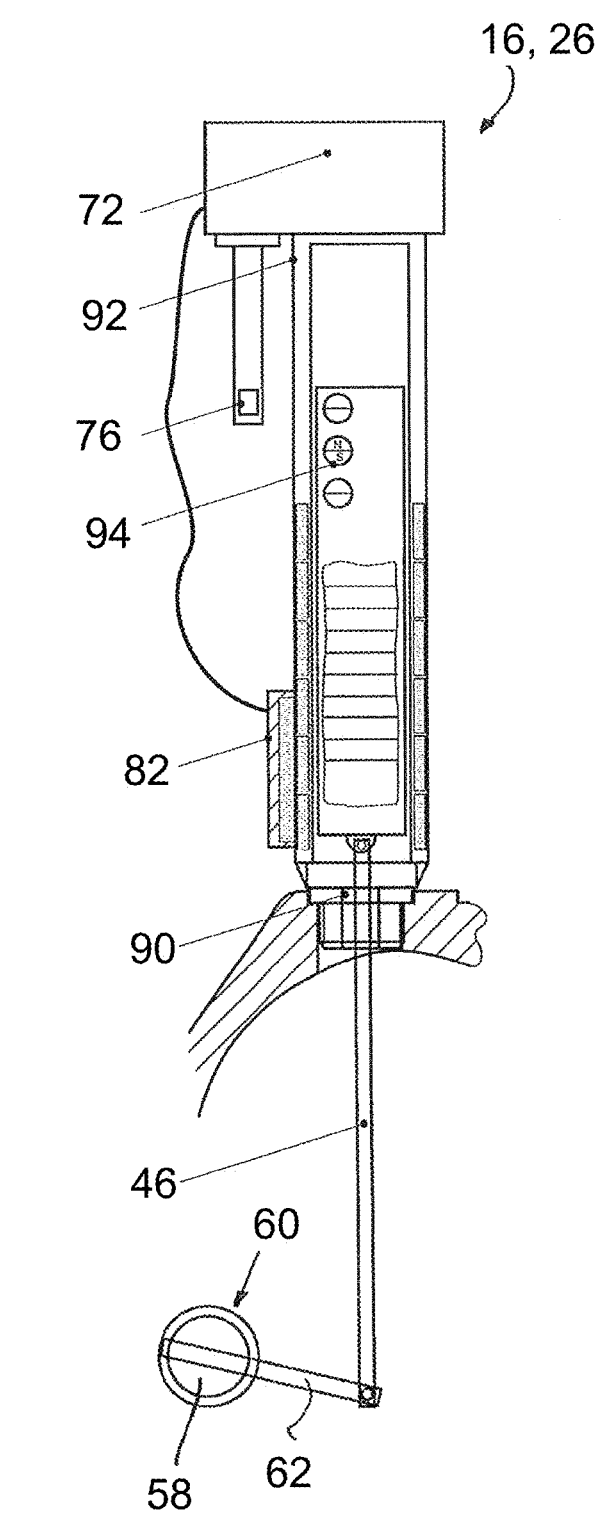
FIGS. 4 and 5 show a second exemplary embodiment of a condensate drain according to the invention in sectional views.
Figure 5:
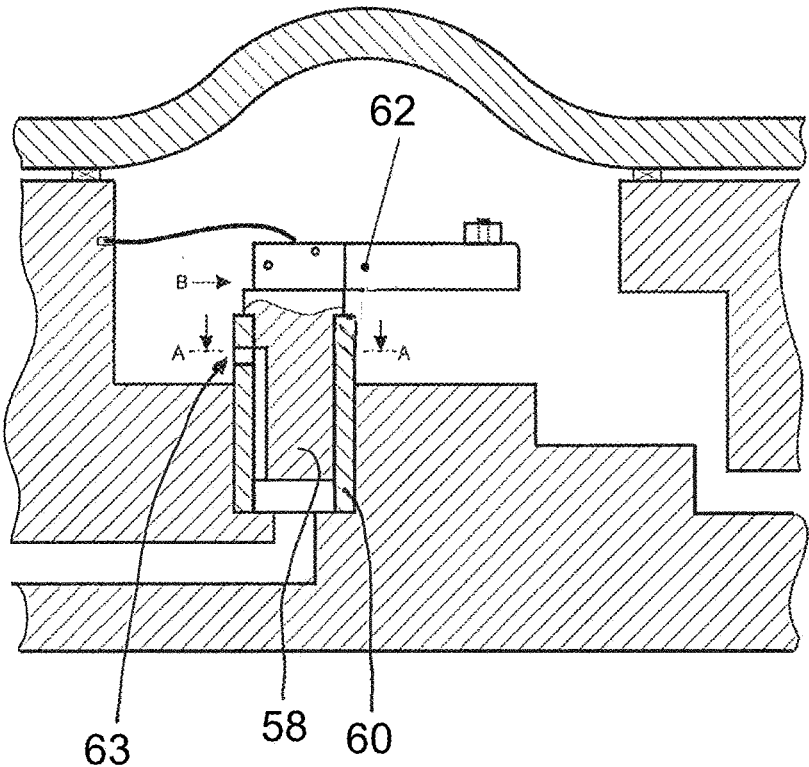

The exemplary embodiment according to FIGS. 4 and 5 utilizes the drive device 16, which is described with respect to FIGS. 1 to 3. In contrast to this, the drive device 16 shown in FIG. 4 has a Hall sensor 76. The Hall sensor 76 is configured for sensing a position of the runner 28 and for determining a valve position from the position of the runner 28. In the exemplary embodiment of FIGS. 4 and 5, the drive rod 46 acts on a valve body 14, which is formed as valve pin 58. The valve pin 58 is rotatably accommodated on a valve sleeve 60. The valve pin 58 has an outlet groove 61, which, when in the release position F, is in fluid-conducting connection with an aperture opening 63 formed in the valve sleeve 60 and which releases a fluid flow through the valve 12 and which, when in the closed position, blocks a fluid flow through the valve 12, wherein the valve body 14 can in particular additionally be brought into an intermediate position Z, in which the outlet groove 61 is at least partly in fluid-conducting connection with the aperture opening 63. This connection can in particular be gathered from FIG. 5. The valve pin 58 is connected to a lever 62, which, in turn, is connected to the runner 28 via the drive rod 46. The connection is formed in such a way that a translatory movement of the runner 28 rotationally moves the valve pin 58 from the release position F into the blocked position S and vice versa. The runner 28 further has sensor magnets 94.

Figure 6:
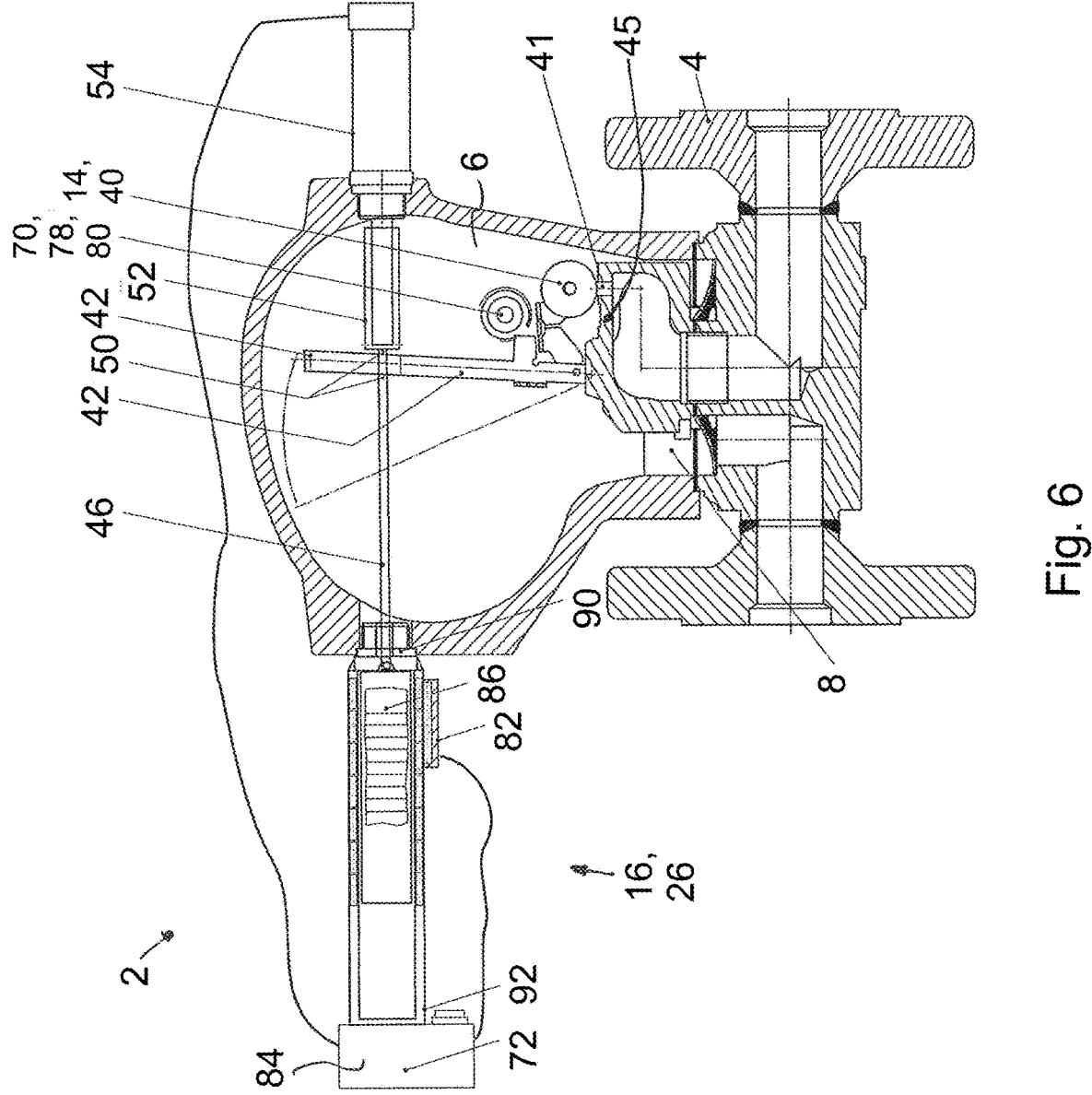
FIG. 6 shows a third exemplary embodiment of a condensate drain according to the invention in a sectional view.

In the exemplary embodiment shown in FIG. 6, the condensate drain 2, in contrast to the exemplary embodiment shown in FIGS. 1 to 3, is flown through essentially horizontally. The runner 28 of the linear motor 26 is driven in an essentially horizontal direction. Reference is moreover made to the description relating to FIGS. 1 to 3.

In contrast to the first-mentioned exemplary embodiment, the condensate drain 2 according to FIG. 6 furthermore does not have a spring element 44 for supporting the roller ball lever 42. The reason for this is that due to the horizontal arrangement of the runner 28, the actuating forces in both lever directions are comparable. A depression 45, into which the roller ball rolls 40, ensures a stable opening position.

Figure 7:
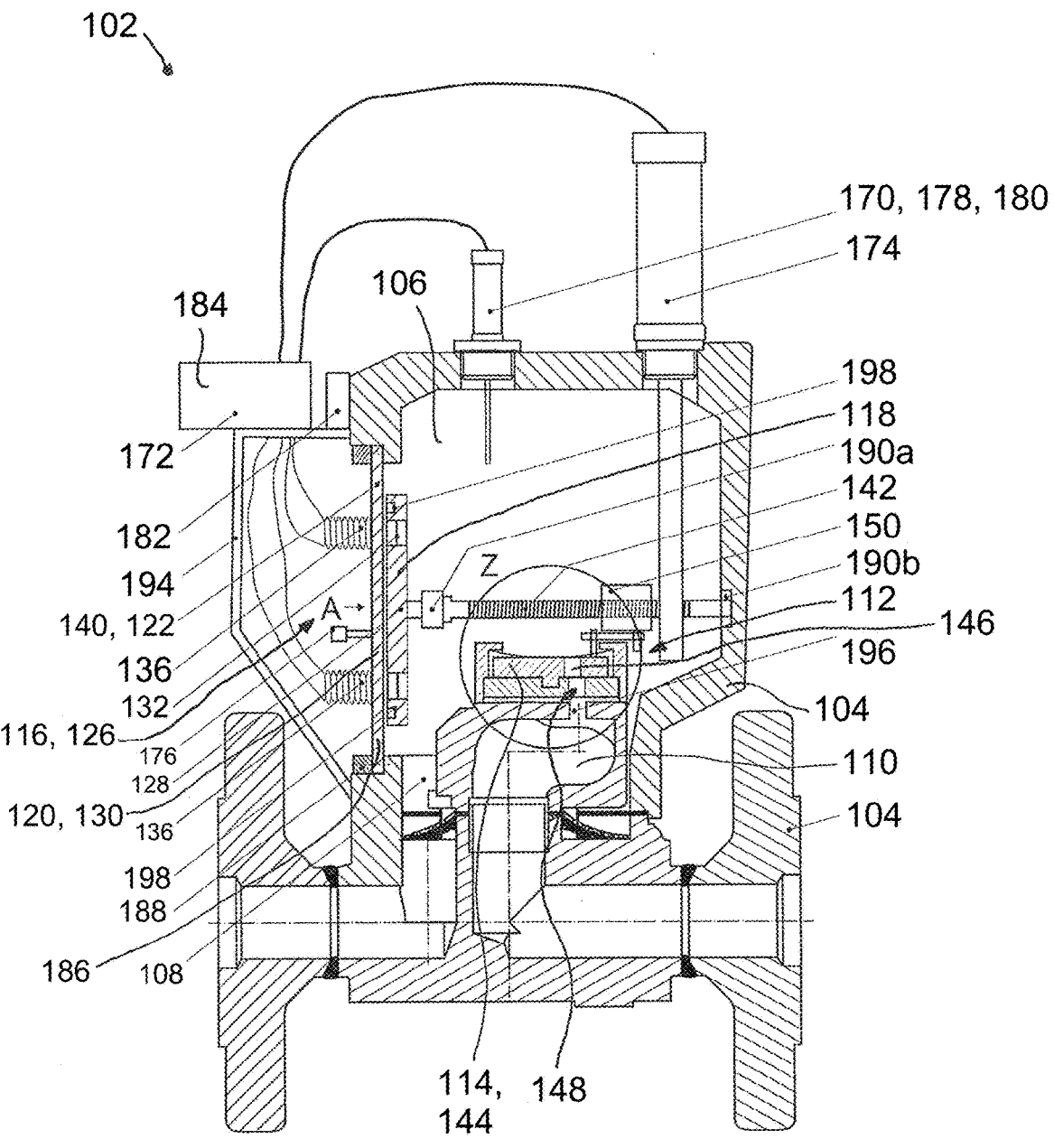
FIG. 7 shows a fourth exemplary embodiment of a condensate drain according to the invention in a sectional view.
Figure 8:
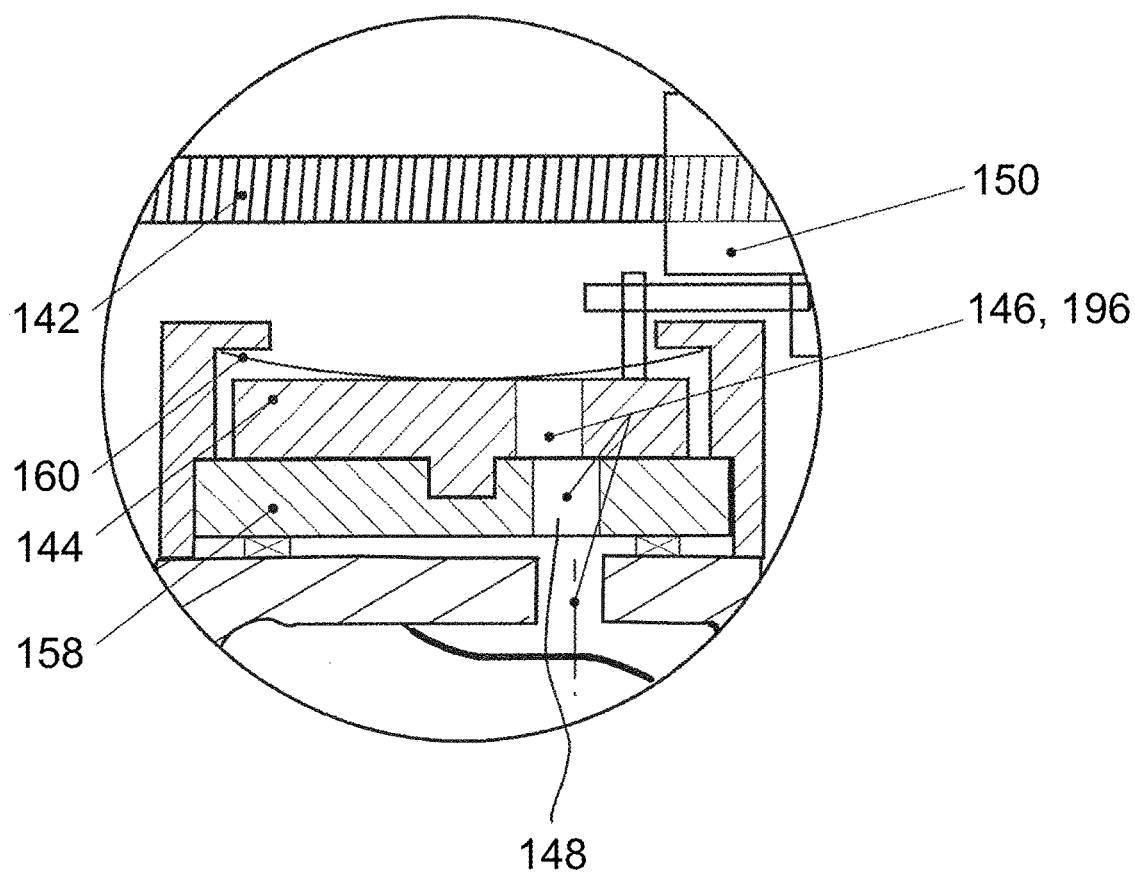
FIG. 8 shows a detail illustration of a section of the condensate drain according to FIG. 8.
Figure 9:
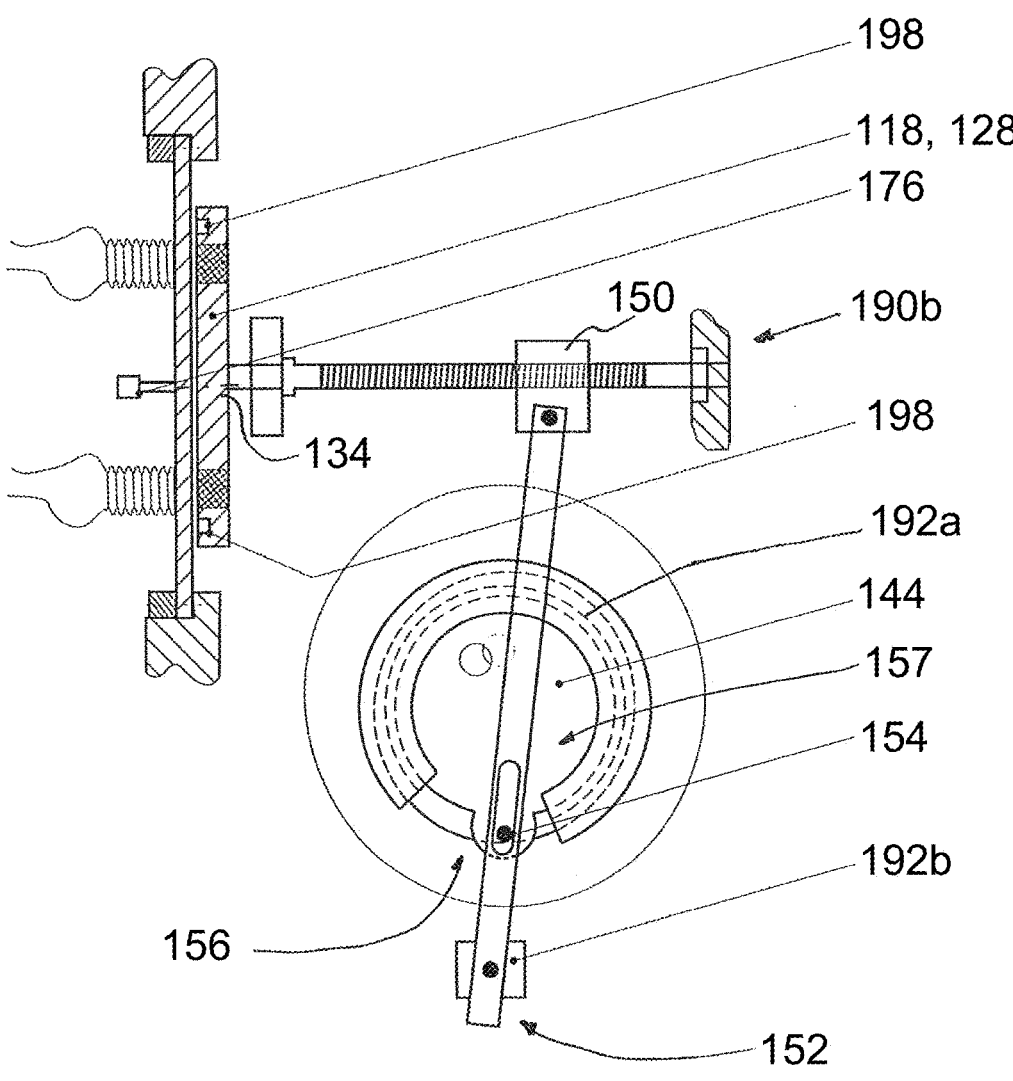
FIG. 9, 10A, 10B show detail illustrations of the condensate drain according to FIG. 7 in different views.

FIGS. 7 to 9 show a further exemplary embodiment of a condensate drain 102 for draining condensate. The condensate drain 102 has a housing 104. An interior space 106 for accommodating a fluid is formed in the housing 104. An inlet 108 for letting fluid into the interior space 106 of the housing 104 is further formed in the housing 104. An outlet 110 for draining fluid out of the interior space 106 of the housing 104 is further formed in the housing 104. A valve 112 with a valve body 114 is arranged in the housing 104. The valve body 114 is configured for being moved into a release position F, see FIG. 7 as well as 8, and a closed position S. When in the release position F, the valve body 114 releases a fluid flow between the interior space 106 and the outlet 110.

When in the closed position S, the valve body 114 does not release a fluid flow between the interior space 106 and the outlet 110, that is, the fluid flow is blocked. The condensate drain 102 further has a drive device 116 for moving the valve body 114. The drive device 116 is configured for moving the valve body 114 into the release position F and the closed position S. The drive device 116 is formed as magnetically acting drive 116, in particular as direct drive 116, and is encased by a drive housing 194. The drive device 116 has a movable drive part 118. The movable drive part 118 is arranged in the interior space 106 of the housing 104 and is coupled to the valve body 114. The condensate drain 102 further has a static drive part 120, which is arranged outside of the interior space 106 and which is in particular separated from the latter in a fluid-tight manner by means of a wall section 122. The static drive part 120 is configured for driving the movable drive part 118 by means of a magnetic drive force.

In the present case, the drive device 116 is formed as axial flux motor 126. The movable drive part 118 is formed as rotor 128. The static drive part 120 is formed as stator 130. The rotor 128 has three or more permanent magnets 132, in particular six permanent magnets 132, which are arranged equidistantly from an axis of rotation 134 of the rotor 128 and evenly spaced apart from one another in a circumferential direction. The rotor 128 further has sensor magnets 198.

The stator 130 has at least three coils 136, in particular six coils 136. The coils 136 are configured for generating a magnetic field for driving the rotor 128. The coils 136 have the same distance from the axis of rotation 134 of the rotor 128 as the magnets 132. The coils 136 further have a ferromagnetic core 138 for strengthening the magnetic field. The rotor 128 is accommodated on the inner side of a housing wall 140 of the interior space 106, also referred to as magnetic window 186. The stator 130 is arranged on the outer side of the housing wall 140 or of the magnetic window 186, respectively. The rotor 128 is connected in a rotationally fixed manner to a spindle 142, wherein the spindle 142 is mounted in a rotationally movable manner on the housing 104.

The valve body 114 is formed as disk 144, which is rotatable about an axis of rotation, with an aperture recess 146. The aperture recess 146 can be made to overlap with a flow channel 148, which is formed as outlet bore 196, by means of rotation of the disk 144 into the release position F in such a way that a fluid-conducting connection to the outlet 110 is released and the disk 144 blocks a fluid-conducting connection to the outlet by means of rotation into the closed position S.

The spindle 142 has a spindle runner 150, which is coupled to the disk 144 via an actuating section 156 in such a way that an axial movement of the spindle runner 150 along the spindle 142 effects a rotation of the disk 144 into the release position F and the closed position S. The actuating section 156 is pivotably mounted on an end facing away from the spindle runner 150. The disk 144 has a cam 154, which is movably guided on a groove 157 of the actuating section 156 in such a way that a pivoting movement of the actuating section 156 effects a rotation of the disk 144.

In the present case, the disk 144 is an upper disk 144, wherein a lower disk 158, which serves as rotary bearing for the upper disk 144, is arranged below the upper disk 144, wherein in particular the upper disk 144 is pushed against the lower disk 158 by means of a spring element 160. The disks 144, 158 are made of a ceramic material.

The condensate drain 102 further has a sensor device 170. The condensate drain 102 furthermore has a control device 172, which is configured for controlling the drive device 116. The sensor device 170 has a level electrode 174 formed on the housing 104. The level electrode 174 is configured for sensing a fluid level in the housing 104. The sensor device 170 further has a Hall sensor 176. The Hall sensor 176 is configured for sensing a position of the rotor 128 and for determining a valve position from the position of the rotor 128. The sensor device 170 further has a pressure sensor 178 and/or a temperature sensor 180 accommodated in the housing 104.

The control device 172 is connected in a wired or wireless manner to the sensors 174, 176, 178, 180 so as to conduct signals. The control device 172 is configured for controlling the drive device 116 in such a way that the latter moves the valve body 114 into the closed position S or the release position F as a function of a measuring value of at least one of the sensors 174, 176, 178, 180. A Peltier element 182 is further arranged on the housing 104. The Peltier element 182 is configured for generating electrical energy from a temperature difference between a housing temperature and an ambient temperature of the housing 104. Alternatively or additionally, the condensate drain 102 has an external energy supply (not shown). The Peltier element 182 is connected to the drive device 116 and the control device 172, wherein the electrical energy generated by the Peltier element 182 is used for operating the drive device 116 and the control device 172.

The magnetic window 186 is screwed to the housing 104 by means of a housing screw connection 188. The spindle 142 is furthermore mounted on the housing 104 by means of bearings 190a, 190b. The actuating section 156 is mounted by means of bearing blocks 192a, 192b, wherein the bearing block 192b is formed is pivot bearing 152.

Figure 10A:
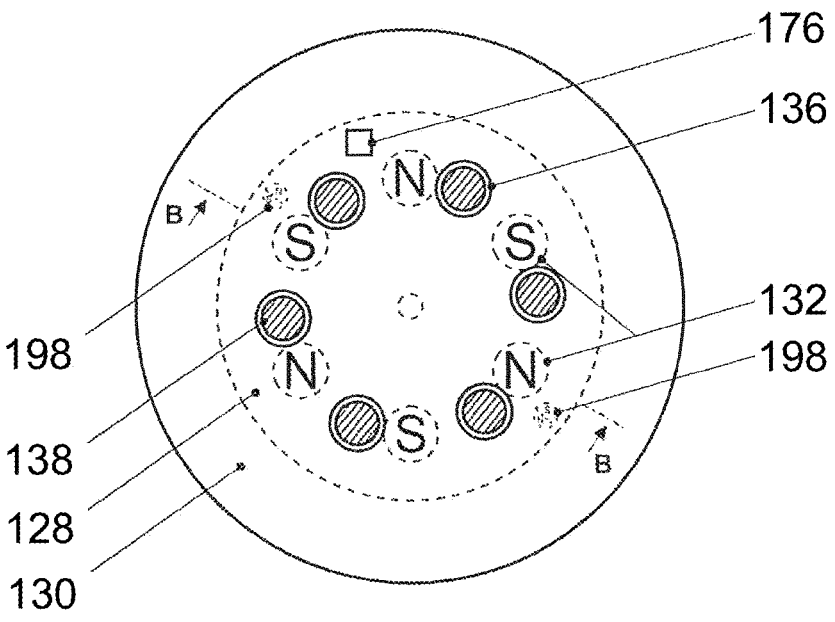
Figure 10B:
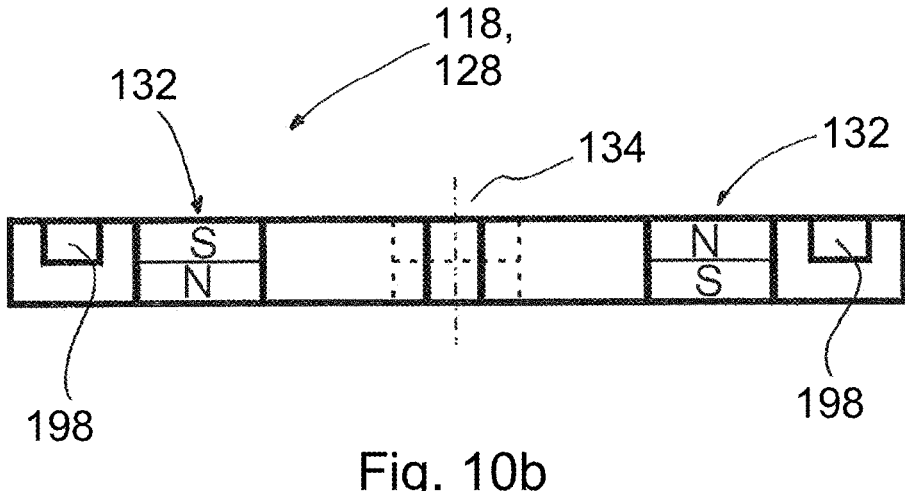

FIG. 10*a* shows the rotor 128. The rotor 128 has permanent magnets 132, which interact with the coils 138 of the stator 130 (not shown). The coils 138 have a ferromagnetic core 138. Sensor magnets 198 are further arranged on the rotor 128, as is also shown in FIG. 10*b*. The Hall sensor 176 provides for the position monitoring of the rotor 128.

LIST OF REFERENCE NUMERALS

2 condensate drain
4 housing
6 interior space
8 inlet
10 outlet
12 valve
14 valve body
16 drive device (electromagnetic drive)
18 movable drive part
20 static drive part
22 wall section
24 compensating gap
26 linear motor
28 runner
30 stator
32 tube
33 tube inner side
34 permanent magnets (ring or disk magnet)
35 tube outer side
36 distance piece
38 coil
40 roller ball
41 valve seat
42 roller ball lever
43 elongated hole
44 spring element
45 depression
46 drive rod
47 bearing
50 pin
52 sliding sleeve
54 position indicator
58 valve pin
60 valve sleeve
61 outlet groove
62 lever
63 aperture opening
70 sensor device
72 control device
76 Hall sensor
78 pressure sensor
80 temperature sensor
82 Peltier element
84 data interface
86 end piece runner
88 spring bearing
90 housing screw connection
92 drive housing
94 sensor magnet
102 condensate drain
104 housing
106 interior space
108 inlet
110 outlet
112 valve
114 valve body
116 drive device (electromagnetic drive)
118 movable drive part

120 static drive part
122 wall section
126 axial flux motor
128 rotor (drive disk)
130 stator
132 permanent magnet
134 axis of rotation of the rotor
136 coil
138 ferromagnetic core
140 housing wall
142 spindle
144 rotatable disk
146 aperture recess
148 flow channel
150 spindle runner
152 pivot bearing
154 cam of the disk
156 actuating section
157 groove of the actuating section
158 lower disk
160 spring element
170 sensor device
172 control device
174 level electrode
176 Hall sensor
178 pressure sensor
180 temperature sensor
182 Peltier element
184 data interface
186 magnetic window
188 housing screw connection
190*a* bearing for spindle
190*b* bearing for spindle
192*a* bearing block
192*b* bearing block
194 drive housing
196 outlet bore
198 sensor magnet
F release position
S closed position
Z intermediate position

The invention claimed is:

1. A condensate drain for draining condensate, with a housing, an interior space formed in the housing for accommodating a fluid, an inlet formed in the housing for introducing fluid into the interior space of the housing, an outlet formed in the housing for draining fluid out of the interior space of the housing, a valve arranged in the housing with a valve body, which is configured for being moved into a release position and a closed position, wherein the valve body, when in the release position, releases a fluid flow between the interior space and the outlet and, when in the closed position, blocks a fluid flow between the interior space and the outlet, a drive device for moving the valve body, which is configured for moving the valve body into the release position and/or the closed position, wherein the drive device is formed as electromagnetic or magnetically acting drive or has an electromagnetic drive, and wherein the valve body is formed as roller ball, which is configured for releasing a valve seat of the valve when in the release position and for closing the valve seat when in the blocked position.

2. The condensate drain according to claim 1,
wherein the drive device has a movable drive part, which is arranged in the interior space of the housing and which is coupled to the valve body,
and a static drive part, which is arranged outside of the interior space and which is separated from the latter in a fluid-tight manner in particular by means of a wall section, wherein the static drive part is configured for driving the movable drive part by means of a magnetic drive force.

3. The condensate drain according to claim 2,
wherein the drive device is formed as linear motor and wherein the movable drive part is formed as runner and the static drive part as stator.

4. The condensate drain according to claim 3,
wherein the drive device has a tube, which is connected in a fluid-conducting manner to the housing on the inner side and in the interior of which the runner is accommodated and the outer side of which is sealed against the housing, wherein the stator is arranged or formed on the outer side of the tube.

5. The condensate drain according to claim 3,
wherein the runner has at least two permanent magnets, which are in particular formed as ring or disk magnet.

6. The condensate drain according to claim 5,
wherein the permanent magnets are separated from one another by means of a distance piece.

7. The condensate drain according to claim 3,
wherein the stator has at least two coils, which are configured for generating a magnetic field for driving the runner.

8. The condensate drain according to claim 3,
wherein the linear motor is configured for capacitively determining a position of the runner.

9. The condensate drain according to claim 1,
wherein the valve body is configured for releasing the valve seat in sections in at least one intermediate position, which lies between the release position and the blocked position.

10. The condensate drain according to claim 1,
wherein the roller ball is arranged on a roller ball lever and wherein the roller ball lever is connected to a runner in such a way that a translatory movement of the runner moves the roller ball from the release position into the blocked position and vice versa.

11. The condensate drain according to claim 1,
wherein the condensate drain is flown through essentially horizontally when in an operating position and wherein a runner of a linear motor is driven in an essentially horizontal direction.

12. The condensate drain according to claim 1,
wherein the condensate drain is flown through essentially vertically when in an operating position and wherein a runner of a linear motor is driven in an essentially vertical direction.

13. The condensate drain according to claim 10,
wherein the roller ball lever is supported on the housing by means of a spring element in such a way that a movement of the roller ball lever into the release position is supported by a spring force of the spring element and a movement of the roller ball lever into the closed position tensions the spring element.

14. The condensate drain according to claim 1,
further comprising at least one sensor device for detecting at least one operating state of the fluid and/or of the condensate drain and for providing at least one signal, which represents the at least one operating state.

15. The condensate drain according to claim 14,
further comprising a control device, which is formed for receiving the at least one signal and for outputting a control signal to the drive device for moving the valve body and/or to a higher-level controller.

16. The condensate drain according to claim 15,
wherein the control device is connected in a wired or wireless manner to the sensors so as to conduct signals, wherein the control device is configured for controlling the drive device in such a way that the latter moves the valve body into the closed position or the release position as a function of a measuring value of at least one of the sensors.

17. The condensate drain according to claim 15,
wherein the control device has a data interface, which is configured for receiving data from a wired or wireless network and/or for sending data to a wired or wireless network, wherein the data has at least one of the following:
measuring values of at least one of the sensors,
position of a runner or of a rotor as indicator for the valve position,
control data for controlling the drive device.

18. The condensate drain according to claim 1,
wherein a sensor device has a level electrode formed on the housing for detecting a level of the fluid, which level electrode preferably extends essentially vertically in an operating position and which is configured for sensing a fluid level in the housing.

19. The condensate drain according to claim 1,
wherein a sensor device has one or several Hall sensors, which is configured for sensing a position of a runner and/or rotor and for determining a valve position in particular from the position of the runner and/or rotor.

20. The condensate drain according to claim 1, wherein a sensor device has a pressure sensor and/or temperature sensor accommodated in the housing.

21. The condensate drain according to claim 1,
wherein a Peltier element is arranged on the housing, in particular on the drive device, which Peltier element is configured for generating electrical energy from a temperature difference between a housing temperature and an ambient temperature of the housing and/or wherein the condensate drain has an external energy supply.

22. The condensate drain according to claim 21,
wherein the Peltier element is connected to the drive device and/or a control device and wherein the electrical energy generated by the Peltier element is used for operating the drive device and/or the control device.

23. A method for draining condensate, in particular by using a condensate drain according to claim 1, with the steps:
sensing a measuring value, which is indicative of a fluid level within an interior housing space of the condensate drain;
controlling a drive device in such a way that the latter moves a valve body of the condensate drain into the closed position or the release position as a function of the measuring value.

24. A condensate drain for draining condensate, with
a housing,
an interior space formed in the housing for accommodating a fluid,
an inlet formed in the housing for introducing fluid into the interior space of the housing, an outlet formed in the housing for draining fluid out of the interior space of the housing, a valve arranged in the housing with a valve body, which is configured for being moved into a release position and a closed position, wherein the valve body, when in the release position, releases a fluid flow between the interior space and the outlet and, when in the closed position, blocks a fluid flow between the interior space and the outlet, a drive device for moving the valve body, which is configured for moving the valve body into the release position and/or the closed position, wherein the drive device is formed as electromagnetic or magnetically acting drive or has an electromagnetic drive, wherein the drive device is formed as axial flux motor and wherein a movable drive part is formed as rotor and a static drive part as stator, and wherein the valve body is formed as disk, which is rotatable about an axis of rotation, with an aperture recess, wherein the aperture recess is made to overlap with a flow channel by means of rotation of the disk into the release position in such a way that a fluid-conducting connection to the outlet is released and the disk blocks a fluid-conducting connection to the outlet by means of rotation into the closed position.

25. The condensate drain according to claim 24,
wherein the rotor has three or more permanent magnets, in particular six permanent magnets, which are in particular spaced apart equidistantly from an axis of rotation of the rotor and evenly from one another in the circumferential direction.

26. The condensate drain according to claim 24,
wherein the stator has three or more coils, in particular six coils, which are configured for generating a magnetic field for driving the rotor, wherein the coils in particular have the same distance from the axis of rotation of the rotor as the magnets, in particular wherein at least one, in particular all of the coils, have a ferromagnetic core for strengthening the magnetic field.

27. The condensate drain according to claim 24,
wherein the rotor is accommodated on the inner side of a housing wall of the interior space and wherein the stator is arranged on the outer side of the housing wall.

28. The condensate drain according to claim 24,
wherein the rotor is connected in a rotationally fixed manner to a spindle and wherein the spindle is mounted in a rotationally movable manner on the housing.

29. The condensate drain according to claim 28,
wherein the spindle has a spindle runner, which is coupled to the disk via an actuating section in such a way that an axial movement of the spindle runner along the spindle effects a rotation of the disk into the release position and the closed position.

30. The condensate drain according to claim 29,
wherein the actuating section is pivotably mounted on an end facing away from the spindle runner and wherein the disk has a cam, which is movably guided in a groove of the actuating section in such a way that a pivoting movement of the actuating section effects a rotation of the disk.

31. The condensate drain according to claim 24,
wherein the disk is an upper disk and wherein a lower disk, which serves as rotary bearing for the upper disk, is arranged below the upper disk, wherein in particular the upper disk is pushed against the lower disk by means of a spring element.

32. The condensate drain according to claim 31,
wherein at least one of the disks, in particular both disks are made of a ceramic material.

33. A condensate drain for draining condensate, with
a housing, an interior space formed in the housing for accommodating a fluid, an inlet formed in the housing for introducing fluid into the interior space of the housing, an outlet formed in the housing for draining fluid out of the interior space of the housing, a valve arranged in the housing with a valve body, which is configured for being moved into a release position and a closed position, wherein the valve body, when in the release position, releases a fluid flow between the interior space and the outlet and, when in the closed position, blocks a fluid flow between the interior space and the outlet, a drive device for moving the valve body, which is configured for moving the valve body into the release position and/or the closed position, wherein the drive device is formed as electromagnetic or magnetically acting drive or has an electromagnetic drive, wherein the valve body is formed as valve pin, which is rotatably accommodated in a valve sleeve, and wherein the valve pin has an outlet groove, which, when in the release position, is in fluid-conducting connection with an aperture opening formed in the valve sleeve and which releases a fluid flow through the valve and which, when in the closed position, blocks a fluid flow through the valve.

34. The condensate drain according to claim 33,
wherein the valve pin is connected to a lever and wherein the lever is connected to a runner in such a way that a translatory movement of the runner rotationally moves the valve pin from the release position into the blocked position and vice versa.

35. The condensate drain according to claim 33, wherein the valve body can additionally be brought into an intermediate position, in which the outlet groove is at least partly in fluid-conducting connection with the aperture opening.

* * * * *